3,008,925
EPOXY RESIN COMPOSITIONS AND
HARDENERS THEREFOR
Elizabeth S. Lo, Fords, N.J., assignor to Johnson &
Johnson, a corporation of New Jersey
No Drawing. Filed Oct. 31, 1958, Ser. No. 770,917
25 Claims. (Cl. 260—47)

This invention relates to novel epoxy compositions having improved solvent resistant characteristics. The invention also includes novel epoxy compositions, possessing improved resistance to heat distortion and improved thermal stability.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

It is well known to those familiar with the electrical industry that epoxy resins cured with solid hardeners provide potting and encapsulating compositions. In certain instances, it is desirable that the cured epoxy composition be resistant to attack by commercial hydrocarbon and halogenated solvents. Accordingly, one of the objects of this invention is to provide novel epoxy compositions having improved solvent resistance.

In many applications of epoxy resins, it is very desirable that the cured epoxy resin be uniform in nature. Then too, it is important that epoxy resins subjected to elevated temperatures possess high resistance to heat distortion and good thermal stability.

The use of solid diamine hardeners as curing agents in epoxy compositions for use as potting and encapsulating compositions is well known to those familiar with the electrical industry. A chief drawback of solid amine hardeners in such compositions, however, is the difficulty encountered in mixing the viscous epoxy resin and solid diamine hardener. This difficulty is due to the high melting point of solid amine hardeners. Heat approaching the melting point of the amine hardener is required for adequate mixing and it is very often difficult to control the temperature of the mix due to the exothermic nature of the mixing operation. Accordingly, when the temperature of the mix is not controlled uniformly, there results a mass of non-uniform characteristics. Such non-uniform compositions have low resistance to distortion and instability at elevated temperature.

Accordingly, another object of this invention is to provide a novel method for facilitating uniform mixing of epoxy resins and solid diamine hardeners. A further object of this invention is to provide novel compositions of matter comprising a uniform mixture of epoxy resins and solid diamine hardeners. Yet a further object of this invention is to provide novel epoxy compositions having improved resistance to distortion at elevated temperatures. A still further object of this invention is to provide novel epoxy compositions having improved thermal stability. Yet a further object of this invention is to provide a novel method for lowering the melting point of solid diamine hardeners. A further object of this invention is to provide novel solid diamine hardener compositions having reducing melting points.

It has been found that the objects of this invention may be realized including in the hardening agent for an epoxy resin, a phenol condensation product of a phenol and a cyclic anhydride or dibasic acid which under proper conditions form a cyclic anhydride.

In accordance with one aspect of this invention, it has been found that a conventional epoxy resin may be cured with a phenol condensation type of the aforementioned type. The phenol condensation product serves as an epoxy hardener and epoxy resins cured in this manner resist attack by commercial hydrocarbon and halogenated solvents.

In accordance with another aspect of this invention, it has been found that a phenol condensation product of the aforementioned type when combined with a solid diamine hardener forms an eutectic mixture, which when mixed with conventional epoxy resins forms novel epoxy systems of improved resistance to heat distortion and improved thermal stability.

The phenol condensation products useful in this invention may be prepared according to the method described by Daas, Tewari and Dutt, Proc. Indian Acad. Sci., 13A, 68 (1941), and 15A, 158 (1941). More particularly, these condensation products used in this invention are prepared by reacting a phenol type compound selected from the group consisting of phenols and substituted phenols such, for example, as alkylated phenols, arylated phenols, polyhydroxy phenols, alkylated polyhydroxy phenols and halogenated derivatives of the foregoing with a compound selected from the group consisting of phthalic, maleic, succinic, naphthalaic and sulfonephthalic acids and anhydrides as well as substituted derivatives thereof such, for example, as alkylated and halogenated derivatives of the foregoing. In the above reaction, the molar ratio of phenol to dibasic compound is at least 2:1. These condensation products in general are of the following structures:

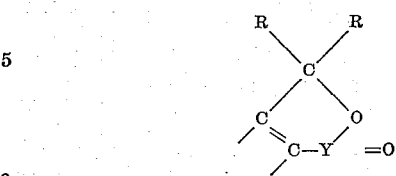

or

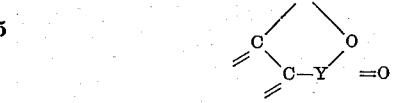

where R is a radical selected from the group consisting of a hydroxy phenol radical and substituted derivatives thereof, such, for example, as alkylated and halogenated derivatives and Y is selected from the group consisting of C atom and S atom.

Examples of phenol condensation products useful in accordance with this invention are phenolphthalein (reaction product of phenol-phthalic anhydride), cresolphthalein (reaction product of cresol-phthalic anhydride), fluorcene (reaction product of resorcinol-phthalic anhydride), cathecholmalein (reaction product of pyrocathechol and maleic acid), phenolmalein (reaction product of phenol and maleic anhydride), thymolsulfonephthalein (reaction product of thymol and sulphonephthalic anhydride), orthocresol-sulfonephthalein (reaction product of orthocresol and sulphonephthalic anhydride), cresolmalein (reaction product of cresol and maleic acid), phenol-succein (reaction product of phenol and succinic anhydride), Eosin A (reaction product of 1,6 dibromoresorcinol and phthalic anhydride), and phenolnaphthalein (reaction product of phenol and naphthalic anhydride).

It has been found that a phenol condensation product of the aforementioned type when combined with a solid diamine hardener serves to reduce the melting point of the amine hardener. Although the present invention is chiefly concerned with the reduction of diamine hardeners having a melting point in the range of 25° to 300°, the principles of the invention are applicable to all solid polyamine hardeners useful in curing epoxy resins. Examples of amine hardeners useful in accordance with this invention are 4,4′-diamino diphenyl sulfone, methylene dianiline and phenylene diamine.

As indicated earlier, it has been discovered that the phenol-condensation product when combined with the solid diamine hardener form an eutectic mixture. The eutectic mixture and epoxy resin may be effectively mixed at a lower temperature than when the same epoxy resin is combined with the amine hardener alone whereby a more uniform mixture is obtained than has heretofore been possible resulting in improved heat distortion values and thermal stabilities.

Any conventional epoxy resin may be used in accordance with this invention. In general, epoxy resins are formed by the reaction of polyhydric alcohol or phenol with a halodrin such, for example, as an epihalohydrin. Epoxy resins or ethers, whose complete mixing with amine hardeners may be determined in accordance with this invention are exemplified by those disclosed in U.S. Patents 2,801,229; 2,735,829; 2,553,718; and 2,716,099. Specific examples of typical epoxy resins used in accordance with this invention are as follows:

EPOXY RESIN a

Bis-phenol is dissolved in epichlorhydrin in the proportion of 5130 parts (2.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rose only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction the excess epichlorhydrin is removed by vacuum distillation with the use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 123° C., vacuum is applied and distillation continued to a kettle temperature of 170° C. at 25 mm. pressure. The resulting glycidyl polyether of bis-phenol has a Durrans' mercury method of softening point of 10° C., an average molecular weight of 360 ebullioscopic measurement in ethylene dichloride, and an epoxide value of 0.538 epoxy equivalent per 100 grams. It has an epoxide equivalent weight of 186 and a 1,2-epoxy equivalency of 1.93.

EPOXY RESIN b

A solution is prepared by dissolving 2,2-bis-(4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bisphenol (2% excess) is added in installments. The first installment of 300 parts of sodium hydroxide is added and the mixture heated with efficient agitation. The heating is discontinued as the temperature reached 80° C., and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C., at 25 mm. pressure. The resulting liquid glycidyl polyether of 2,2-bis(4-hydroxyphenyl) propane has the following properties:

| | |
|---|---|
| Durrans' °C | 9 |
| Molecular weight | 370 |
| Epoxide value (epoxide equivalent per 100 grams) | 0.50 |
| Epoxide equivalent weight | 200 |
| Hydroxyl value (hydroxyl equivalents per 100 grams) | 0.08 |
| Percent chlorine | 0.46 |

From the above values, $n$ is 0.106 so the average molecule of the polyether contains 1.106 of the aromatic radicals therein. The 1,2-epoxy equivalency of the product is 1.85.

EPOXY RESIN c

An epoxy resin is prepared by reacting 2.04 mols of epichlorhydrin with 1 mol of bis-(4-hydroxyphenyl)-2,2-propane (known to those skilled in the art as bis-phenol) in the presence of 2.14 mols of sodium hydroxide (5% excess). The resin is obtained by preparing a solution with 2280 parts of water, 245 parts of sodium hydroxide and 640 parts of bis-phenol. This solution in a reaction vessel fitted with a stirrer is heated to about 45° C., whereupon 530 parts of epichlorhydrin are rapidly added while agitating the reaction mixture. In about 50 minutes, the temperature of the reaction mixture, without application of external heat, rises to about 95° C., from the exothermic heat of reaction. As the resin is formed, the reaction mixture separates into a two phase system consisting of an aqueous phase and a molten taffy-like resin phase. About 80 minutes after the epichlorhydrin is added, the aqueous layer is removed and the molten resin is washed continuously with hot water until the wash water is neutral to litmus. Then the water is drained from the resin and the resin heated at about 140° C., with agitation until dry. The molten resin is cooled and flaked.

EPOXY RESIN d

A solution consisting of 11.7 parts of water, 1.22 parts of sodium hydroxide, and 13.38 parts of bis-phenol is prepared by heating the mixture of ingredients to 70° C., and then cooling to 46° C., at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20 to 30° C., temperature is started 30 minutes later and continues for 4½ hours. The product is dried by heating to a final temperature of 140° C. in 30 minutes, and cooled rapidly. At room temperature, the product is an extremely viscous, semi-solid having a melting point of 27° C., by Durrans' mercury method and an epoxide equivalent weight of 249.

Commercial examples of typical epoxy resins useful in accordance with this invention are those manufactured by the Ciba Co. and sold under the trade names "Ciba 502," "Ciba 6020" and "Ciba 6010"; those manufactured by Bakelite Division of Union Carbide and Carbon and sold under the trade names "Bakelite 2795" and "Bakelite 3794," those manufactured by the Shell Chemical Company and sold under the trade names "Epon 828," "Epon 834," "Epon 1310," and those manufactured by the Borden Company and sold under the trade name "Epiphen" such, for example, as "Epiphen 851." The physical properties of the above-mentioned epoxy resins are shown in the following Table I:

Table I

| Epoxy resin | Base phenol | Halo-hydrin | Viscosity centipoises | Epoxy equivalent |
|---|---|---|---|---|
| "Ciba 502" | Bis phenol | Epichlorhydrin | 4,500 | 0.38 |
| "Ciba 6005" | do | do | 10,500–17,000 | 0.51–.54 |
| "Ciba 6010" | do | do | 18,000 | 0.51 |
| "Ciba 6020" | do | do | 20,000–30,000 | 0.47–.495 |
| "Ciba 6060" | do | do | M.P. 50–70° C. (Durrans). | 0.23 |
| "Bakelite 2795" | Bis phenol A about 10% reactive diluent. | do | 500–900 | 0.54 |
| "Bakelite 3794" | Bis phenol A with a small amount of a trihydric phenol. | do | 7,000–19,000 | 0.57 |
| "Epon 828" | Bis phenol A | do | 13,500–19,500 | 0.51 |
| "Epon 834" | Polyhydric phenol. | do | M.P. 27° C. (Durrans). | 0.39 |
| "Epiphen 851" | Novolac | do | 2,000–8,000 | 0.55 |

Further examples of epoxy resins used in this invention are those manufactured by reacting novolac resins and epihalohydrins such as epichlorohydrin. As well known to those skilled in the art, novolac resins are phenol-formaldehyde resins prepared by reacting less than one mole formaldehyde per mole of phenol. The novalac resins structurally resemble dihydroxy diphenyl methane and their chains are phenol ended. These resins are described in the "Chemistry of Phenolic Resins," book authored by Martin and published by Wiley & Sons, 1956, p. 87. Epoxidized novalac resins are disclosed in U.S. Patents 2,658,884; 2,658,885 and 2,716,099.

When the phenol condensation product is added to an epoxy resin as a hardener for obtaining a cured mass of improved solvent resistant properties, the amount of phenol-condensation product required for adequate curing of a particular epoxy resin can be calculated from the following equations:

(1) $\frac{\text{M.W. of phenol-condensation product}}{\text{Number of replaceable hydrogens}}$ = Equivalent weight of phenol condensation product.

(2) Equivalent weight of phenol condensation product × epoxy equivalent of epoxy resin per 100 grams of epoxy resin = Grams of phenol condensation product to be used for every 100 grams of epoxy resin.

It should be realized that the minimum amount of hardener used may deviate somewhat from the calculated amount such, for example, as 10% and still obtain a satisfactory cure. Of course, an excess of hardener over the calculated amount may be used. In commercial operation the excess is kept within 10% for economical reasons.

The following examples illustrate the preparation of an epoxy composition formed in accordance with the instant invention.

EXAMPLE A 100 grams of epoxy resin "Ciba 6005" and 84.2 grams of phenolphthalein are mixed together and heated at 120° C. for 3 hours and then at 180° C. for 6 hours. The heat distortion value of the resulting cured epoxy resin was 123° C. The cured epoxy resin was found to be insoluble in chloroform. When the same epoxy resin was cured with a conventional amine hardener (dianiline sulfone), the resulting mass was found to be soluble in chloroform.

EXAMPLE B

The same as in Example A except the epoxy resin is "epoxy resin A." As indicated heretofore, in accordance with another aspect of this invention, a phenol condensation product of the aforementioned type is combined with a solid diamine hardener to form an eutectic mixture, which when combined with a conventional epoxy resin forms an epoxy system of improved resistance to heat distortion and improved thermal stability. In forming said eutectic mixture, the phenol-condensation product is generally in an amount from about 5 to about 60% by weight, and preferably about 10 to about 45% by weight of total eutectic mixture.

The amount of hardener to be used for 100 grams of particular epoxy resins can be calculated from the below equations, keeping in mind that both the phenol-condensation product and the solid diamine hardener serve as curing agents for the epoxy resin:

$M$ = equivalent weight of amine hardeners
$N$ = equivalent weight of phenol condensation product
$A/B$ = weight ratio of amine hardener/phenol condensation product $$\frac{MXA}{A+B} \times \text{(epoxy equivalent of epoxy resin)} = \text{grams of amine hardener}$$

$$\frac{NXB}{A+B} \times \text{(epoxy equivalent of epoxy resin)} = \text{grams of phenol condensation product}$$

It should be realized that the minimum amounts of each above hardener may deviate somewhat from the calculated amount such, for example, as 5% and still obtain a satisfactory cure. Of course, an excess of one or both may be used but in commercial operations the total excess is kept within 10% for economical reasons.

In general, procedure used to make an eutectic of a solid diamine hardener and a phenol condensation product such as phenolphthalein or one of its analogues, is as follows:

A weighed amount of diamine is melted carefully on a hot plate. The required amount of phenolphthalein is added to the melted solution in small portions with stirring. After the addition is completed, the mixture is cooled to room temperature. It is melted again with stirring and cooled. This process is repeated at least twice, so as to make sure that the resulting mixture is (the eutectic solid) homogeneous. In most cases, the product formed is a clear amorphous low melting mass.

Following the above procedure a number of eutectic mixtures were prepared in accordance with the present invention. The amounts of solid diamine hardener (A) and phenol condensation product (B) employed are shown in the following Table II. In determining the heat distortion values shown in the last column of Table II, the amount of the eutectic mixture indicated in column 4 was combined with 100 grams of "Ciba 6005" resin with the exception of Example 3. In Example 3, the eutectic mixture was cured with a 50:50 mixture of "Epon 1310" and "Epon 828."

EXAMPLE 24

43 grams of the eutectic mixture of Example 16 and 100 grams of "Ciba 6020."

EXAMPLE 25

45.0 grams of the eutectic mixture of Example 9 and 100 grams of epoxy resin $a$.

EXAMPLE 26

40 grams of the eutectic mixture of Example 8 and 100 grams of epoxy resin $b$.

Table II

| Sample No. | Components | | Weight ratio A/B | Weight eutectic mix—100 grams epoxy (grams) | Softening point (° C.) of the eutectic solid | Degree (° C.) depressed with respect to component (A) | Heat distortion value ° C. |
| --- | --- | --- | --- | --- | --- | --- | --- |
| | A | B | | | | | |
| 1 | Dianiline sulfone (M.P. 175° C.) | | 100/0 | 32.2 | 175 | None | 168 |
| 2 | Dianiline sulfone | Phenolphthalein (M.P. 261° C.) | 86/14 | 42.5 | 77 | 98 | 177 |
| 3 | do | do | 80/20 | 42.5 | 76 | 99 | 148 |
| 4 | do | Phenolphthalein | 75/25 | 43.0 | 68–72 | 107 | 173 |
| 5 | Dianiline sulfone (M.P. 175° C.) | Cathechol phthalein | 75/25 | 42.0 | 75–80 | 100 | 162 |
| 6 | Dianiline sulfone | Fluorecene | 75/25 | 43.0 | 78–85 | 97 | 175 |
| 7 | do | M-cresol malein | 75/25 | 44.4 | 70–75 | 105 | 157 |
| 8 | do | Phenol malein | 75/25 | 44.4 | 65–70 | 110 | 166 |
| 9 | Dianiline sulfone (M.P. 175° C.) | O-cresol phthalein | 75/25 | 44.4 | 70–74 | 105 | 152 |
| 10 | Dianiline methane (M.P. 93° C.) | Phenolphthalein | 80/20 | 32.2 | 67–70 | 25 | 144 |
| 11 | do | Fluorcene | 80/20 | 32.2 | 70–80 | 23 | 137 |
| 12 | M-phenylene diamine (M.P. 62° C.) | Phenolphthalein | 80/20 | 17.5 | ¹ App. 30 | 30 | 131 |

¹ This eutectic mixture remained liquid for 48 hours at room temperature.

Additional examples of eutectic mixtures formed in accordance with this invention are shown in below Table III.

Table III

| Ex. No. | Components | | Weight ratio A/B | Softening pt. (° C.) of the eutectic solid | Degrees (° C.) depressed with respect to component A |
| --- | --- | --- | --- | --- | --- |
| | A | B | | | |
| 13 | Dianiline sulfone (M.P. 175° C.) | Phenolphthalein (M.P. 261° C.) | 60/40 | 84 | 91 |
| 14 | do | do | 50/50 | 85 | 90 |
| 15 | do | Thymol sulfonephthalein | 75/25 | 90 | 85 |
| 16 | do | Orthocresol sulfonephthalein | 75/25 | 82 | 93 |

Additional examples of cured epoxy systems formed in accordance with this invention are:

EXAMPLE 17

40 grams of the eutectic mixture of Example 8 and 100 grams of "Ciba 6020."

EXAMPLE 18

45.3 grams of the eutectic mixture of Example 9 and 100 grams of "Bakelite 2795."

EXAMPLE 19

48 grams of the eutectic mixture of Example 10 and 100 grams of "Bakelite 3794."

EXAMPLE 20

19 grams of the eutectic mixture of Example 4 and 100 grams of "Ciba 6060."

EXAMPLE 21

53.6 grams of the eutectic mixture of Example 13 and 100 grams of "Ciba 6020."

EXAMPLE 22

64.5 grams of the eutectic mixture of Example 14 and 100 grams of "Ciba 6020."

EXAMPLE 23

43 grams of the eutectic mixture of Example 15 and 100 grams of "Ciba 6020."

EXAMPLE 27

30 grams of the eutectic mixture of Example 10 and 100 grams of epoxy resin $c$.

EXAMPLE 28

38 grams of the eutectic mixture of Example 11 and 100 grams of epoxy resin $d$.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. A composition of matter in the form of a solid eutectic mixture comprising: (1) a solid aromatic amine hardener useful in curing a 1,2 epoxy resin and having a higher melting point than the eutectic mixture, and (2) a phenol condensation product selected from the group consisting of phenolphthaleins, phenolmaleins, phenolsucceins, phenolnaphthaleins and phenolsulfonephthaleins, the mixture of amine hardener and phenol condensation product having been liquefied by heat in the formation of the eutectic mixture.

2. A composition of matter according to claim 1 wherein the amine hardener is a solid diamine hardener.

3. A composition according to claim 2 wherein the solid amine hardener is selected from the group consisting of 4,4' diamino diphenyl sulfone, methylene dianiline and phenylene diamine.

4. A composition of matter according to claim 2 wherein the phenol condensation product is a phenolphthalein.

5. A composition of matter according to claim 2 wherein the phenol condensation product is a phenolmalein.

6. A composition of matter according to claim 2 wherein the phenol condensation product is a phenolsuccein.

7. A composition of matter according to claim 2 wherein the phenol condensation product is a phenolnaphthalein.

8. A composition of matter according to claim 2 wherein the phenol condensation product is a phenolsulfonephthalein.

9. A novel method for lowering the melting point of a solid aromatic amine hardener useful in curing a 1,2 epoxy resin comprising adding to said hardener in an amount sufficient to form a solid eutectic mixture, a phenol condensation product and liquefying the amine hardener-phenol condensation mixture by heat to form a solid eutectic thereof, said phenol condensation product selected from the group consisting of phenolphthaleins, phenolmaleins, phenolsucceins, phenolnaphthaleins and phenolsulfonephthaleins.

10. A novel method according to claim 9 wherein the amine hardener is a solid diamine hardener.

11. A novel method according to claim 10 wherein the solid amine hardener is selected from the group consisting of 4,4' diamino diphenyl sulfone, methylene dianiline and phenylene diamine.

12. A novel method according to claim 10 wherein the phenol condensation product is a phenolphthalein.

13. A novel method according to claim 10 wherein the phenol condensation product is a phenolmalein.

14. A novel method according to claim 10 wherein the phenol condensation product is a phenolsuccein.

15. A novel method according to claim 10 wherein the phenol condensation product is a phenolnaphthalein.

16. A novel method according to claim 10 wherein the phenol condensation product is a phenolsulfonephthalein.

17. A novel epoxy system having improved resistance to heat distortion and improved thermal stability comprising a 1,2 epoxy resin and a solid eutectic mixture of (1) a solid aromatic amine hardener useful in curing said 1,2 epoxy resin and having a higher melting point than the solid eutectic mixture and (2) a phenol condensation product selected from the group consisting of phenolphthaleins, phenolmaleins, phenolsucceins, phenolnaphthaleins and phenolsulfonephthaleins.

18. A novel epoxy system according to claim 17 wherein the amine hardener is a solid diamine hardener.

19. A novel epoxy system according to claim 18 wherein the solid amine hardener is selected from the group consisting of 4,4' diamino diphenyl sulfone, methylene dianiline and phenylene diamine.

20. A novel epoxy system according to claim 18 wherein the phenol condensation product is a phenolphthalein.

21. A novel epoxy system according to claim 18 wherein the phenol condensation product is a phenolmalein.

22. A novel epoxy system according to claim 18 wherein the phenol condensation product is a phenolsuccein.

23. A novel epoxy system according to claim 18 wherein the phenol condensation product is a phenolnaphthalein.

24. A novel epoxy system according to claim 18 wherein the phenol condensation product is a phenol-sulfonephthalein.

25. A novel epoxy system having improved solvent resistance comprising a 1,2 epoxy resin and a hardener of phenol condensation product selected from the group consisting of phenolphthaleins, phenolmaleins, phenolsucceins, phenolnaphthaleins and phenolsulfonephthaleins.

References Cited in the file of this patent

UNITED STATES PATENTS 2,801,229  De Hoff et al. _____ July 30, 1957